United States Patent
Groce

[15] 3,685,557
[45] Aug. 22, 1972

[54] CONTROLLED STUMP REMOVER
[72] Inventor: Ernest F. Groce, Pomona, Calif.
[73] Assignee: Wayne Manufacturing Company, Pomona, Calif.
[22] Filed: July 23, 1970
[21] Appl. No.: 57,539

[52] U.S. Cl. .................................................144/2 N
[51] Int. Cl. .............................................A01g 23/06
[58] Field of Search........................................144/2 N

[56] References Cited
UNITED STATES PATENTS 3,568,740   3/1971   Speakman..................144/2 N
3,308,860   3/1967   DeShano.....................144/2 N

*Primary Examiner*—Donald R. Schran
*Attorney*—White, Haefliger and Bachand

[57] ABSTRACT

A stump removal machine includes a control console for actuator mechanism controlling a power driven stump cutter carried, for example, on a vehicle. The console is advantageously supported for bodily displacement between retracted and extended positions relative to the vehicle so that an operator may displace the console to extended position from which he may have unobstructed observation of the cutter during stump cutting.

8 Claims, 8 Drawing Figures

Patented Aug. 22, 1972
3,685,557
3 Sheets-Sheet 1
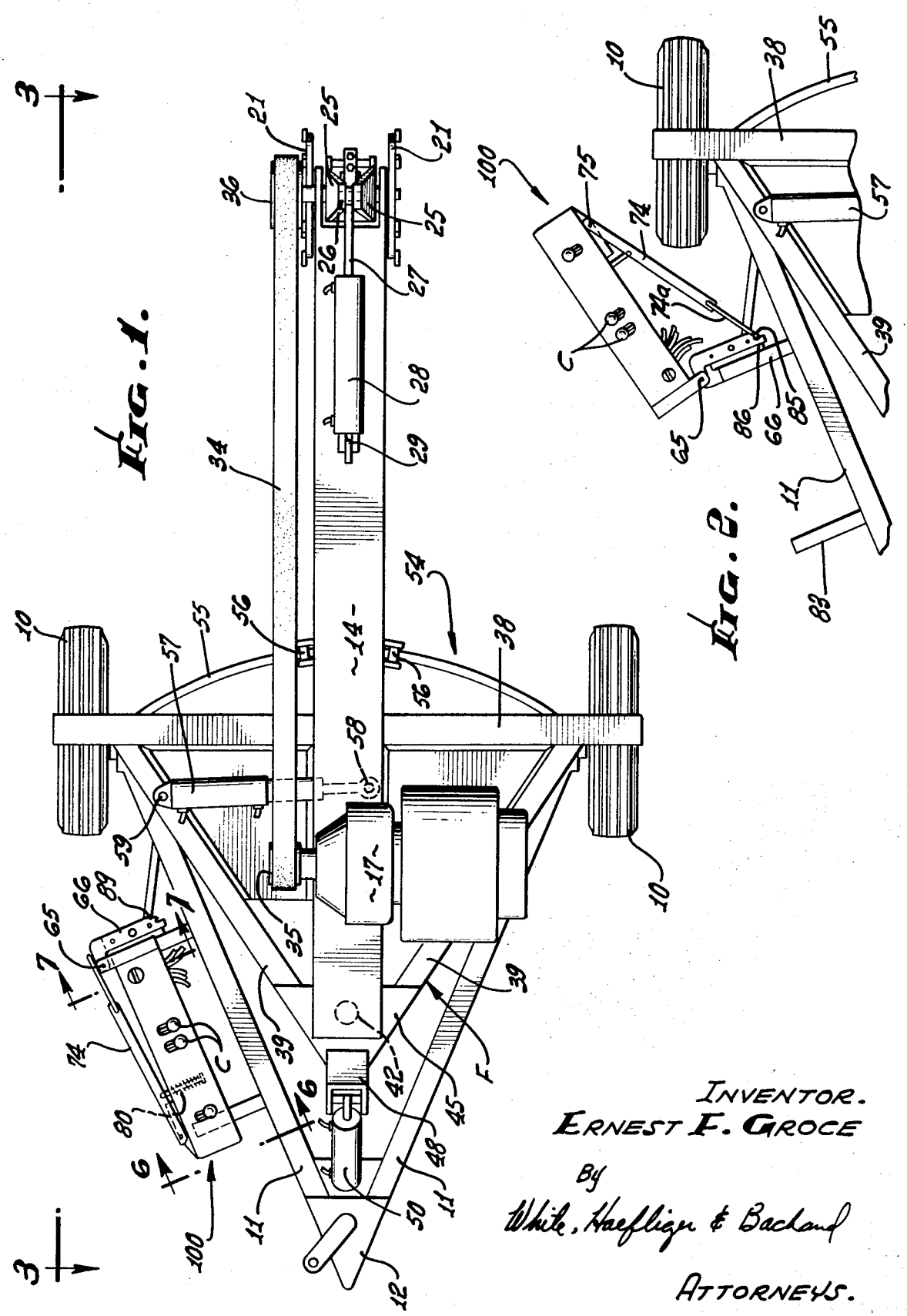
INVENTOR.
ERNEST F. GROCE
By
White, Haefliger & Bachand
ATTORNEYS.

Patented Aug. 22, 1972
3,685,557
3 Sheets-Sheet 2
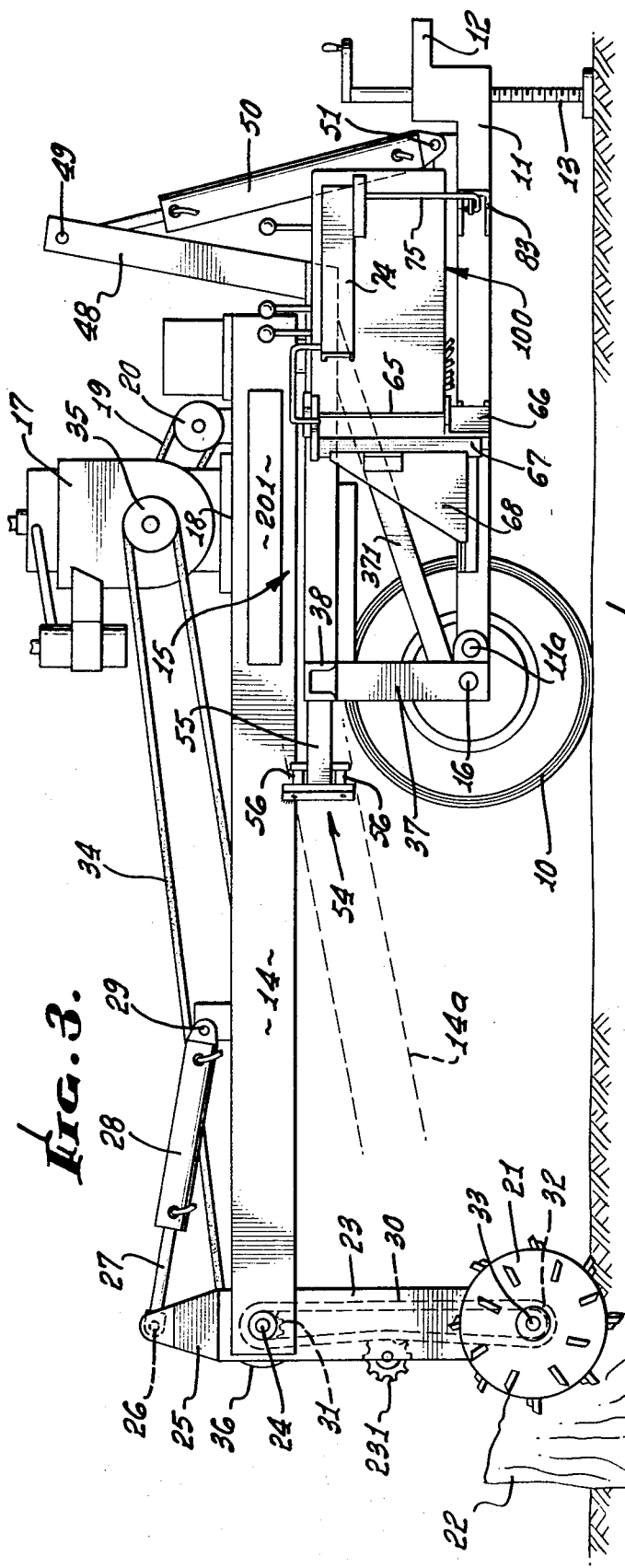
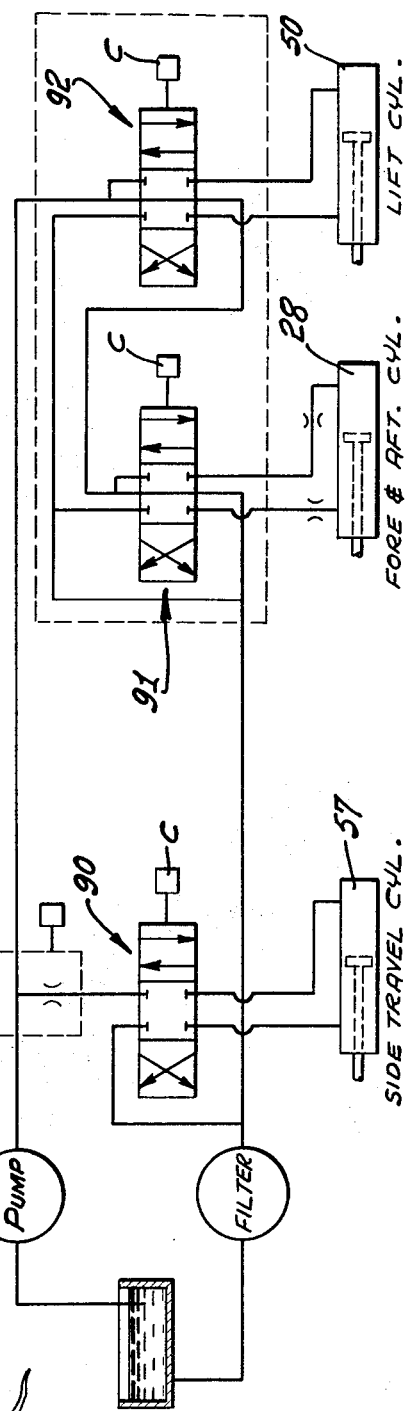
INVENTOR.
ERNEST F. GROCE
By White, Haefliger & Bachand
ATTORNEYS.

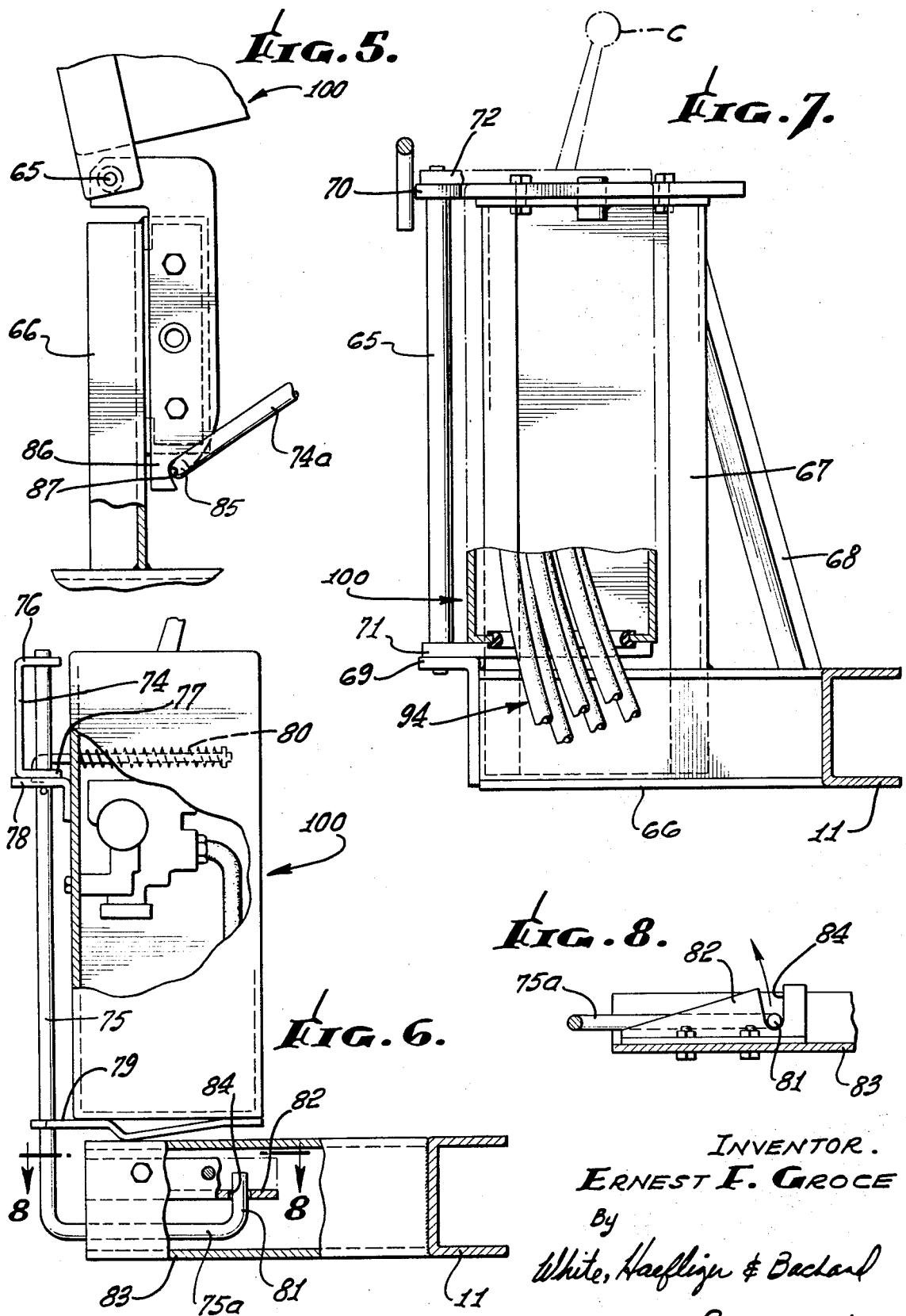

CONTROLLED STUMP REMOVER

BACKGROUND OF THE INVENTION

The invention has in common with prior stump removal machines employing a powered stump disintegrating cutter, mounting of the machine components on a two-wheel trailer having a forward draft connection and at its rear a cutter carrier operable to move the cutter both vertically and laterally to traverse the stump in its cutting action.

Prior machines of this type have achieved these briefly stated cutter movements by the use of mechanisms of relatively complex and expensive construction and which have lacked certain control flexibilities found to be desirable and which have occasioned development of the present machine.

SUMMARY OF THE INVENTION

It is a major object of the invention to provide stump removing apparatus wherein a cutter control console is adjustable with respect to the vehicle so as to overcome prior difficulties with machine control. Basically, the environment of the invention comprises a power driven rotary cutter and means to support and displace the cutter during stump cutting rotation thereof, such means including a vehicle and a carriage and actuator mechanism supported thereby; and in this environment a control console includes manual control means for the actuator mechanism, and structure supports the console for bodily displacement between retracted and extended positions relative to the vehicle so that an operator may displace the console to extended position from which he may then have unobstructed observation of the cutter during stump cutting.

Additionally, and as will be seen, such structure may include a vertical pivot about which the console is swingable, the pivot carried remotely from the cutter and by the vehicle; retainer means may releasably retain the console in its extended and retracted positions, and such retainer means may include unusually advantageous arm structure as will be described.

These and other objects and advantages of the invention, as well as the details of an illustrative embodiment, will be more fully understood from the following description and drawings, in which:

BRIEF DESCRIPTION OF THE DRAWINGS

FIG. 1 is a plan view of the machine with the control console retracted, as during vehicle travel;

FIG. 2 is a fragmentary plan view of the machine with the control console extended;

FIG. 3 is a side elevation of FIG. 1 showing the cutter engaged with a stump;

FIG. 4 is a schematic showing of a hydraulic control system;

FIG. 5 is an enlarged fragmentary plan view showing pivotal mounting of the control console:

FIG. 6 is an enlarged elevation taken on line 6—6 of FIG. 1 showing mounting of the control console;

FIG. 7 is an enlarged elevation taken in section on line 7—7 of FIG. 1 and showing mounting of the control console; and FIG. 8 is a horizontal section taken on line 8—8 of FIG. 6.

DESCRIPTION OF THE PREFERRED EMBODIMENTS

The machine components are shown to be transportable by a trailer type vehicle on carriage having axially aligned wheels 10 and a forward draft A-frame having convergent members 11 suitably connectible at 12 to a pulling vehicle, the frame when the machine is in use being stabilized by jack 13 carried by the frame. Members 11 have pivotal connections 11a with supports 37, and one member 11 may mount a console 100 incorporating controls C for the hydraulically actuated device employed for operation of the machine components as will appear. See in this regard Robert E. Wellborn copending application for U.S. Letters Patent entitled "Stump Removal Machine", Ser. No. 884,218, now U.S. Pat. No. 3,625,267.

The mechanisms include an elongated boom 14 mounted on a carriage structure generally indicated at 15 above the wheel axis 16 and preferably at an elevation above the wheels 10 so that the horizontal or lateral swing range of the boom can be free of interference by the wheels. Power for operation of the machine components is derived from engine 17 having its base 18 supported on the boom, the engine having drive connection 19 with an hydraulic pump 20 also carried by the boom. The latter may contain an accommodation for fuel and oil generally indicated at 201.

At its rear end the boom mounts rotary cutters 21 of known type rotatable to disintegrate the stump 22. The cutters are carried by spaced arms 23 interconnected by a portion of the arm assembly which depends from the boom and is mounted for oscillation about shaft 24. The arms 23 have upper yoke extensions 25 pivotally connected at 26 to the shaft 27 of hydraulic cylinder 28 which in turn is pivoted at 29 to the boom. Upon actuation by hydraulic fluid supplied from the pump 20, the cylinder 28 operates to swing cutters 21 and arms 23 longitudinally of the boom to effect the cutter traverse across the stump 22. The cutters are shown to be driven by chain 30 extending past idler 231 about sprocket 31 on shaft 24 and about the sprocket 32 carried by the cutter shaft 33. Sprocket 31 and the chain are driven from the engine 17 by way of belt 34 carried by sheaves 35 and 36.

The carriage structure 15 comprises a pair of arms 37 having braces 371 and depending from transverse member 38, the arms being pivoted for oscillation about the wheel axis 16. Forwardly of member 38 the carriage includes an A-configuration frame F comprising members 39 converging to an apex as illustrated in FIG. 1. The boom 14 is pivoted at 42 to the carriage A-frame at the convergence of members 39 to gussett 45 which mounts the boom pivot. At its rear the carriage has a rigid upwardly extending arm 48 to which is pivotally connected at 49 an hydraulic cylinder 50 connected at 51 to the draft frame and operable to oscillate the carriage about its pivots at 16, thus to swing the boom vertically as between the solid and broken line positions 14 and 14a appearing in FIG. 3. Forwardly of the arms 37 and the carriage frame member 38 the carriage mounts a suitable means generally indicated at 54 for supporting the boom 14 throughout the range of its lateral swinging movement. The support at 54 is shown in FIG. 1 to comprise arcuate track 55 joined to member 38 and adapted to be traveled by rollers 56 mounted to the sides of the boom. The boom is actuated in its lateral swing by hydraulic cylinder 57 connected at 58 to the boom and at 59 to the carriage.

In operation of the machine, the trailer is positioned in appropriate proximity to the stump 22 and anchored in place by the trailer hitch 12. As will be understood, while the vehicle is traveling the cutters 21 will be elevated by the boom to ground clearance. At the stump location the cutters are lowered and started in operation at an elevation sufficient to disintegrate the stump exposure, for which purpose the boom may be swung laterally by the actuator 57 within required working range. After disintegration of the stump exposure, the carriage 15 may be elevated by actuator 50 to swing about the wheel axis and in so doing to lower the boom as to the FIG. 3 broken line position. The boom thus lowers the cutters 21 to such subsurface depths as may be required for disintegration of the stump roots.

In accordance with the invention, structure is provided to support the control console 100 for bodily displacement relative to the vehicle between retracted and extended position (as for example are seen in FIGS. 1 and 2 respectively), so that an operator may displace the console to extended position from which he may have unobstructed observation of the cutter during stump cutting. For example, when the console is retracted for travel as seen in FIG. 1, the carriage and boom are interposed between the console and cutter, whereas in FIG. 2 the console is extended so that an operator may look over the wheel 10 to sidewardly observe the cutter.

The referred to structure may advantageously include a vertical pivot 65 carried by a member 11 via a horizontal extension 66 therefrom as seen in FIG. 7. The extension carries vertical support structure 67, braced at 68, to in turn carry the pivot 65 at vertically spaced arm locations 69 and 70. Brackets 71 and 72, attached to the console 100, are rotatably connected to the pivot, as shown so that the weight of the console is transmitted to the arms 69 and 70.

Further, retainer means is provided to releasably retain the console in each of the retracted and extended positions. Such retainer means may with unusual advantage include a yieldably urged arm 74 pivotally attached to the console as at pivot location 75, the arm having detent attachment to the vehicle in each of the positions, as for example are illustrated in FIG. 5 and 8. First, with regard to FIGS. 6 and 8, the pivot 75 is rigidly connected to the arm at locations 76 and 77; the brackets 78 and 79 attached to the console 100 swing about the pivot rod 75; and a spring 80 urges the arm 74 toward the console. A lower extension 75a of the pivot rod 75 includes a cam follower terminal 81 which rides up the cam 82 mounted on the vehicle arm extension 83 and snaps into the keeper slot 84 for retention. To release such retention the arm 74 is pulled relatively away from the console against the resistance of spring 80.

In extended position, as seen in FIGS. 2 and 5, a follower 85 or extension 74a of the arm 74 rides over the cam 86 mounted on vehicle arm extension 66 and snaps into the keeper slot 87 for retention. Again, to release such retention, the arm is pulled relatively away from the console against the resistance of spring 80.

FIG. 4 illustrates one form of hydraulic control system included in the console to be operated by manual control C. Note the hydraulic valves 90, 91 and 92 having the reversing positions indicated by the arrows, at opposite sides of the neutral positions in which the valves are illustrated. Hydraulic lines 94 project below the console as seen in FIG. 7.

I claim:

1. In tree stump removing apparatus comprising a power driven rotary cutter and means to support and displace the cutter during stump cutting rotation thereof, said means including a vehicle and a carriage and actuator mechanism supported thereby, the combination comprising
   a. a control including manual control means for said actuator mechanism,
   b. structure supported by said support means and supporting the console for bodily displacement between retracted and extended positions relative to the vehicle so that an operator may displace the console to extended position from which he may then have unobstructed observation of the cutter during stump cutting,
   c. said structure including a first vertical pivot about which the console is swingable closely adjacent the pivot and between said positions, the first pivot carried by the vehicle remotely from the cutter, there being a first keeper carried by the vehicle and a second pivot carried by the console and having an extension releasably retained in the first keeper in said console retracted position, and
   d. an arm pivotably carried by said second pivot, a spring yieldably urging the arm toward the console, and a second keeper carried by the vehicle and releasably retaining said arm in said console extended position.

2. The combination of claim 1 wherein said actuator mechanism includes multiple actuators to effect bodily displacement of the cutter in multiple directions, and said manual control means includes multiple manual controls for the respective actuators.

3. The combination of claim 1 wherein the carriage extends between the cutter and said console in retracted position thereof.

4. The combination of claim 1 wherein the vehicle has spaced aligned wheels, said support means includes an elongated boom suspending the cutter, and said carriage mounts the boom for lateral swinging and up and down pivoting displacement relative to the console.

5. The combination of claim 4 in which the carriage is mounted by the vehicle for oscillation about the wheel axis and relative to the console to control the cutting depth of the cutter.

6. The combination of claim 4 wherein said support means includes an arm carrying the cutter and depending from and pivoted to the boom near a free end thereof, said actuator mechanism including an actuator operable to oscillate said arm relative to the boom.

7. The combination of claim 4 wherein said actuator mechanism includes an actuator operable to swing the boom laterally relative to the carriage.

8. The combination of claim 4 wherein said actuator mechanism includes an actuator operable to pivot the boom and said carriage up and down relative to said vehicle.

* * * * *

UNITED STATES PATENT OFFICE
CERTIFICATE OF CORRECTION

Patent No. 3,685,557  Dated August 22, 1972

Inventor(s) Ernest F. Groce

It is certified that error appears in the above-identified patent and that said Letters Patent are hereby corrected as shown below:

Column 4, line 15; " a. a control including manual control means for said " should read -- a. a control console including manual control means for said --

Signed and sealed this 20th day of February 1973.

(SEAL)
Attest:

EDWARD M. FLETCHER, JR.  ROBERT GOTTSCHALK
Attesting Officer  Commissioner of Patents